US009100755B2

(12) United States Patent
Takeda et al.

(10) Patent No.: US 9,100,755 B2
(45) Date of Patent: Aug. 4, 2015

(54) SOUND REPRODUCING APPARATUS FOR SOUND REPRODUCTION USING AN ULTRASONIC TRANSDUCER VIA MODE-COUPLED VIBRATION

(75) Inventors: Katsu Takeda, Osaka (JP); Masaki Tada, Osaka (JP); Masashi Minakuchi, Hyogo (JP); Fumiyasu Konno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 971 days.

(21) Appl. No.: 13/061,762

(22) PCT Filed: Sep. 17, 2009

(86) PCT No.: PCT/JP2009/004668

§ 371 (c)(1), (2), (4) Date: Mar. 2, 2011

(87) PCT Pub. No.: WO2010/032463

PCT Pub. Date: Mar. 25, 2010

(65) Prior Publication Data

US 2011/0170712 A1 Jul. 14, 2011

(30) Foreign Application Priority Data

Sep. 18, 2008 (JP) ................................ 2008-239129

(51) Int. Cl.

*H04B 3/00* (2006.01)
*H04R 25/00* (2006.01)
*H04R 17/10* (2006.01)

(52) U.S. Cl.

CPC ............ *H04R 17/10* (2013.01); *H04R 2217/03* (2013.01)

(58) Field of Classification Search

CPC ............... H04R 17/10; H04R 2217/01; H04R 2217/03; G10K 11/26; G10K 11/34; G10K 11/341; G10K 11/343; G10K 11/345

USPC .......................................... 381/77, 94.9, 190

See application file for complete search history.

(56) References Cited

U.S. PATENT DOCUMENTS 4,283,649 A * 8/1981 Heinouchi .................... 310/324
5,229,980 A * 7/1993 Pawela .......................... 367/157

(Continued)

FOREIGN PATENT DOCUMENTS

CN 1409939 A 4/2003
CN 101262712 A 9/2008

(Continued)

OTHER PUBLICATIONS

Manabu Aoyagi et al.; Ultrasonic Motors Using Longitudinal and Bending Multimode Vibrators with Mode Coupling by Externally Additional Asymmetry or Internal Nonlinearity; Japanese Journal of Applied Physics; The Japan Society of Applied Physics; Japan Society of Applied Physics; Tokyo, JP; vol. 31, No. 9B; Sep. 1, 1992; pp. 3077-3080.

(Continued)

*Primary Examiner* — Duc Nguyen
*Assistant Examiner* — Kile Blair
(74) *Attorney, Agent, or Firm* — RatnerPrestia

(57) ABSTRACT

In a sound reproducing apparatus, part of a frequency band where mode-coupled vibration can be excited is regarded as a carrier frequency. A frequency of mode coupling, with a low rate of change in vibration displacement with respect to the frequency, is regarded as a carrier signal so that a signal in an audible band which is outputted from an audible band signal source can be demodulated and reproduced with stable sound pressure in a broad frequency band.

7 Claims, 12 Drawing Sheets

(56) References Cited

U.S. PATENT DOCUMENTS

| | | | |
|---|---|---|---|
| 5,867,450 | A | 2/1999 | Rogers et al. |
| 6,850,623 | B1 | 2/2005 | Norris et al. |
| 2006/0093154 | A1 | 5/2006 | Kolano et al. |

FOREIGN PATENT DOCUMENTS

| | | | |
|---|---|---|---|
| CN | 200980136600.8 | | 4/2013 |
| JP | 62-296698 | A | 12/1987 |
| JP | 2003-513576 | A | 4/2003 |
| JP | 2003-153371 | A | 5/2003 |
| JP | 2007-228402 | A | 9/2007 |
| JP | 2008-011074 | A | 1/2008 |
| JP | 2008-239129 | | 5/2013 |

OTHER PUBLICATIONS

Supplementary European Search Report for EP 09 81 4308, May 6, 2013.

International Search Report for Application No. PCT/JP2009/004668, Nov. 24, 2009, Panasonic Corporation.

Tanaka et al., "Regarding Practical Realization of Parametric Loudspeaker" ("Consideration on the Practical Use of the Parametric Loudspeaker"), The Acoustical Society of Japan Technical Report, US84-61, 1984 (pp. 1-2, FIGS. 1 and 2) (with English abstract).

* cited by examiner

SOUND REPRODUCING APPARATUS FOR SOUND REPRODUCTION USING AN ULTRASONIC TRANSDUCER VIA MODE-COUPLED VIBRATION

TECHNICAL FIELD

The present invention relates to a sound reproducing apparatus with high directivity, capable of modulating a signal in an audible band and emitting a signal in an ultrasonic band as a carrier, thereby to reproduce a sound wave of the audible band in a specific space range.

BACKGROUND ART

A normal sound reproducing apparatus can directly emit a sound wave of an audible band into a medium such as air through a diaphragm, to propagate the sound wave of the audible band in a relatively broad range by a diffraction effect.

As opposed to this, a sound reproducing apparatus with high directivity has been put into practice for selectively propagating the sound wave of the audible band only to a specific space range. This sound reproducing apparatus is generally called a super directional loudspeaker or a parametric loudspeaker. This modulates a signal in the audible band with a signal in an ultrasonic band as a carrier, further amplifies the signal by a specific scaling factor, and thereafter inputs this modulated signal into a sound emitting unit made up of an ultrasonic transducer and the like, to emit the signal as a sound wave of the ultrasonic band into the medium such as air.

The sound wave emitted from the sound emitting unit propagates to the medium with high directivity due to a propagation characteristic of the ultrasonic wave as the carrier. Moreover, during propagation of the sound wave of the ultrasonic band in the medium, with the medium having elastic nonlinearity, an amplitude of the sound wave of the audible band accumulatively increases, while the sound wave of the ultrasonic band attenuates since being absorbed by the medium or diffused over a spherical surface. As a consequence, the sound wave of the audible band, having been modulated to the ultrasonic band, is self-demodulated to the sound wave of the audible band due to the elastic nonlinearity of the medium, thereby to allow reproduction of the sound wave of the audible band only in a restricted narrow space range.

That is, the super directional loudspeaker is one making use of the elastic nonlinearity of the medium where the sound wave propagates and the high directivity of the ultrasonic wave. For example, the use of the super directional loudspeaker as a loudspeaker for descriptions of exhibitions in an art museum or a museum allows transmission of a sound wave of an audible band only to a person present within a specific space range.

The foregoing sound reproducing apparatus uses, as a carrier frequency, a frequency in the vicinity of a resonance frequency for exciting a resonance mode of the ultrasonic transducer made up of a piezoelectric body and the like in order to increase sound pressure of the sound wave of the audible band which is reproduced by as small an input electric field as possible. In the vicinity of the resonance frequency, mechanical quality factor Qm (constant indicating sharpness of a mechanical vibration displacement in the vicinity of the resonance frequency at the time of the piezoelectric body or the like producing resonance vibration) is high, and a maximal vibration displacement can be obtained with respect to an alternating electric field that is applied.

However, there are variations in resonance frequency of the ultrasonic transducer between individuals, which is attributed to structural conditions such as shapes, dimensions and supporting and fixing methods of the piezoelectric body and the other constitutional elements, and is attributed to material characteristic conditions such as a piezoelectric constant and an elastic constant generated by such processes as polarization and sintering in the case of the piezoelectric body being ceramics. Further, mechanical quality factor Qm is also influenced by a temperature change of the ultrasonic transducer itself and load fluctuations due to the medium such as air, and there has thus been a problem in that, even when an electric fields with the same frequency and the same amplitude are applied to a plurality of ultrasonic transducers, respective vibration amplitudes of the ultrasonic transducers differ, and thereby at the time of demodulation and reproduction of the signal in the audible band, desired sound pressure cannot be obtained depending upon a frequency band of the signal in the audible band.

It is to be noted that Non-Patent Document 1 is known as prior art document information concerning the above sound reproducing apparatus.

PRIOR ART DOCUMENT

Patent Document

[Non-Patent Document 1] "Regarding Practical Realization of Parametric Loudspeaker", written by Tsuneo Tanaka , Mikiro Iwasa, and Youichi Kimura; The Acoustical Society of Japan Technical Report, US84-61, 1984 (pp. 1-2, FIGS. 1 and 2)

DISCLOSURE OF THE INVENTION

The present invention at least includes: an audible band signal source that produces a signal in an audible band; a carrier oscillator that produces a carrier; a modulator that modulates the signal in the audible band with the carrier; and a sound emitting unit that receives an input of a signal outputted from the modulator and outputs a reproduced sound by means of an ultrasonic transducer. The ultrasonic transducer of the sound emitting unit has a plurality of resonance modes in which vibration displacements are maximal at different frequencies, and excites vibration mode-coupled between frequencies for exciting the plurality of resonance modes. Part of a frequency band where the mode-coupled vibration can be excited is regarded as a carrier frequency.

Accordingly, even in the case of variations or fluctuations in resonance frequency of the ultrasonic transducer due to load variations or the like in the manufacturing process of the ultrasonic transducer or during the operation thereof, a vibration amplitude of the ultrasonic transducer fluctuates in a small scale and is stable within the range of frequencies where the mode-coupled vibration can be excited. This can result in realization of stable sound pressure in a broad band at the time of self-demodulation of the sound wave of the audible band.

PREFERRED EMBODIMENTS FOR CARRYING OUT OF THE INVENTION (Embodiment 1)

Figure 1:
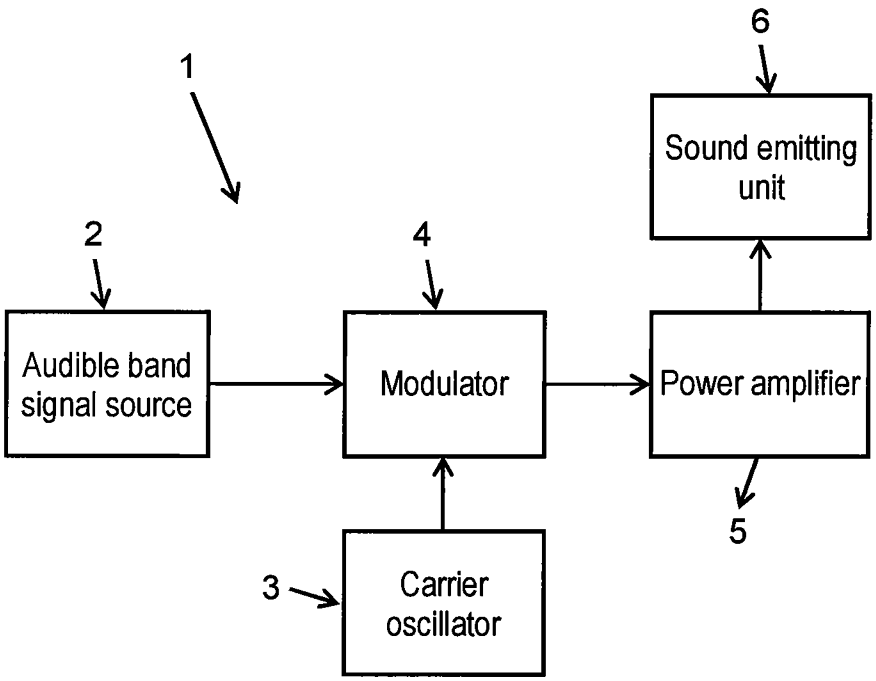
FIG. 1 is a block diagram of a sound reproducing apparatus in Embodiment 1 of the present invention.

Hereinafter, a configuration of a sound reproducing apparatus in present Embodiment 1 is described with reference to the drawings. FIG. 1 is a block diagram of the sound reproducing apparatus in Embodiment 1 of the present invention. FIG. 1 describes a driving section of sound reproducing apparatus 1 of the present invention.

A signal (as a frequency of about 20 Hz to 20 kHz) in an audible band produced in audible band signal source 2 and a carrier (ultrasonic wave of about 20 kHz or larger) produced in carrier oscillator 3 are inputted into modulator 4, and the signal in the audible band is modulated with the carrier. The modulated signal is amplified in power amplifier 5, and inputted into sound emitting unit 6. The signal inputted from modulator 4 into sound emitting unit 6 is emitted as an ultrasonic wave to a medium such as air and propagates a certain distance, whereafter a sound wave of the ultrasonic band as the carrier attenuates, while a sound wave of the audible band is self-demodulated due to elastic nonlinearity of the medium.

As thus described, sound reproducing apparatus 1 in present Embodiment 1 is configured so as to allow reproduction of the sound wave of the audible band only in a very narrow space range by making use of the ultrasonic wave with high directivity as the carrier.

Figure 2:
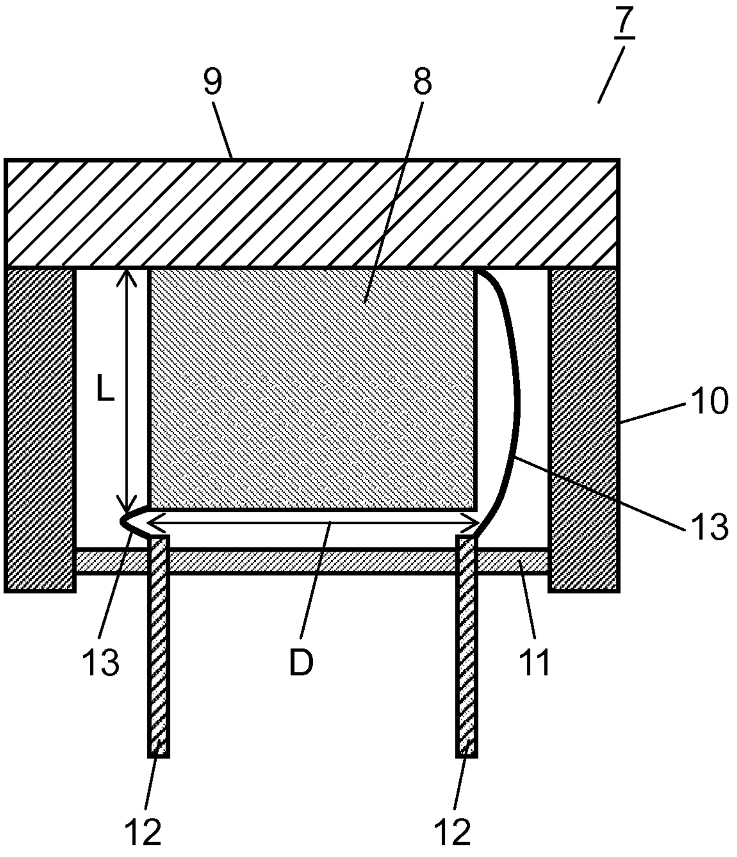
FIG. 2 is a cross-sectional view of an ultrasonic transducer in Embodiment 1 of the present invention.

Next, ultrasonic transducer 7 constituting sound emitting unit 6 is described with reference to FIG. 2. FIG. 2 is a cross-sectional view of ultrasonic transducer 7 in Embodiment 1 of the present invention.

Ultrasonic transducer 7 is a portion that vibrates piezoelectric body 8 upon input of the signal from modulator 4, and emits a sound wave to the medium such as air. Piezoelectric body 8 is cylindrical piezoelectric ceramics made of a complex perovskite-based piezoelectric material (e.g., three component-based piezoelectric ceramic material such as $PbTiO_3$—$ZrTiO_3$—Pb $(Mg_{1/2}Nb_{1/2})TiO_3$), and is disposed in almost the central part of one top surface of acoustic matching layer 9 in the thickness direction, as shown in FIG. 2. When a thickness and a diameter of this piezoelectric body 8 are referred to as L and D, dimensional ratio L/D is about 0.7, and polarized in a direction of thickness L. Herein, piezoelectric body 8 is made of the complex perovskite-based piezoelectric material, but other than this, piezoelectric ceramics and a piezoelectric monocrystal, such as PZT($PbTiO_3$—$ZrTiO_3$)—based ceramics and barium titanate ($BaTiO_3$), and the like may be used.

In the vicinity of the periphery of acoustic matching layer 9, tubular case 10 is fixed so as to surround piezoelectric body 8, thereby protecting piezoelectric body 8 from the outside. In present Embodiment 1, case 10 is made of aluminum.

Further, terminal block 11 is provided at an opening of case 10 (on the inner surface in the vicinity of the opposite end of the case to the portion connected with acoustic matching layer 9). There is a certain clearance provided between this terminal block 11 and piezoelectric body 8 so as to prevent mutual contact therebetween due to a shock from the outside, vibration of piezoelectric body 8, or the like. Moreover, two rod-like terminals 12 are provided on terminal block 11, and these terminals 12 are respectively electrically connected to electrodes of piezoelectric body 8 through leads 13. That is, an alternating electric field can be applied to piezoelectric body 8 through terminals 12.

When an alternating electric field with a specific frequency is applied to the electrodes provided on both principal surfaces of piezoelectric body 8 in ultrasonic transducer 7 configured as thus described, elastic vibration can be excited which is decided based upon a material coefficient, shape, dimensions, and the like. A sound wave generated by this elastic vibration is emitted to the medium such as air through acoustic matching layer 9, and propagated in a specific direction (upward direction in FIG. 2).

Here, acoustic matching layer 9 serves to match acoustic impedances of piezoelectric body 8 and the medium such as air, to reduce attenuation of the sound wave caused by reflection or the like on a boundary plane due to a difference in acoustic impedance between the piezoelectric body and the medium.

It is to be noted that in present Embodiment 1, only one set each of audible band signal source 2, carrier oscillator 3, modulator 4 and power amplifier 5 described above is configured.

Next, a method for deciding a carrier frequency as a point of the present invention is described in detail.

Figure 3:
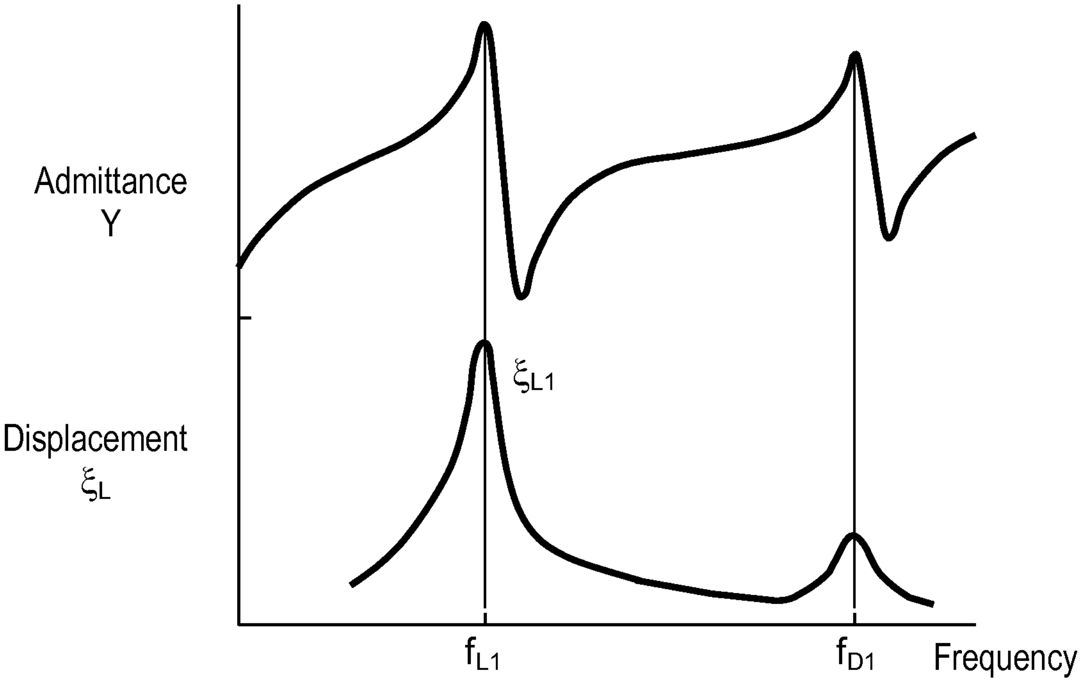
FIG. 3 is a diagram showing frequency characteristics of an admittance and a vibration displacement in a thickness direction of a conventional piezoelectric body.

FIG. 3 is a diagram showing an example of a frequency characteristic of an admittance and a frequency characteristic of a vibration displacement in a thickness direction of a conventional piezoelectric body. Generally, a piezoelectric body can excite a plurality of resonance modes with different vibration directions or different vibration modes based upon shapes (dimensional ratios), a direction of polarization (c-axis in the case of a monocrystal), a direction of an alternating electric field that is applied, or the like.

FIG. 3 is a diagram showing an example of the frequency characteristics of the admittance and the vibration displacement in the thickness direction in the case of dimensional ratio L/D being 2.5 or higher when a thickness and a diameter of a cylindrical piezoelectric body are referred to as L and D. It should be noted that the piezoelectric body in the drawing is piezoelectric ceramics polarized in the thickness direction, and the alternating electric field has been applied in the thickness direction.

When the frequency of the alternating electric field that is applied to the piezoelectric body is changed from the low frequency side to the high frequency side, as shown in FIG. 3, a first resonance mode occurs in which vibration displacement $\xi_{L1}$ in the thickness direction is maximal in the vicinity of frequency $f_{L1}$ at which admittance Y is maximal for the first time. The resonance mode at this frequency $f_{L1}$ is one called longitudinal vibration in the thickness direction.

Further, as the frequency is made higher, a second resonance mode occurs in which a vibration displacement in a radial direction is maximal in the vicinity of frequency $f_{D1}$ at which admittance Y is maximal. The resonance mode at this frequency $f_{D1}$ is one called expansion vibration in the radial direction. It is to be noted that a vibration displacement in the radial direction of this expansion vibration in the radial direction is not shown in FIG. 3.

As shown in FIG. 3, since the piezoelectric body is also an elastic body, simultaneously with occurrence of the vibration displacement in the radial direction, a vibration displacement also occurs in the thickness direction due to Poisson coupling. However, the vibration displacement in the thickness direction in the vicinity of frequency $f_{D1}$ is very small as compared with vibration displacement $\xi_{L1}$ in the vicinity of frequency $f_{L1}$ because of thickness L of the cylinder being larger than diameter D.

At frequencies other than the vicinities of frequency $f_{L1}$ and frequency $f_{D1}$, the vibration displacement in the thickness direction of the piezoelectric body rapidly decreases, to be hardly obtained. Similarly, at the frequencies other than the vicinities of frequency $f_{L1}$ and frequency $f_{D1}$, the vibration displacement in the radial direction also decreases, to be hardly obtained. That is, at the frequencies other than the vicinities of frequency $f_{L1}$ and frequency $f_{D1}$, the piezoelectric body hardly vibrates both in the thickness direction and in the radial direction. This means that the two resonance modes, namely the longitudinal vibration in the thickness direction and the expansion vibration in the radial direction, independently vibrate in the vicinities of the respective resonance frequencies without having an effect upon each other.

As thus described, in the cylindrical piezoelectric body, either thickness L or diameter D is made larger (generally, a cylindrical shape with thickness L made more than 2.5 times as large as diameter D, or a disk shape with diameter D made more than 15 times as large as thickness L), whereby the respective resonance modes independently vibrate without having an effect upon each other, while mechanical quality factors Qm of the respective resonance modes become high.

As opposed to this, in ultrasonic transducer 7 of sound reproducing apparatus 1 in present Embodiment 1, cylindrical piezoelectric body 8 with dimensional ratio L/D of thickness L to diameter D made about 0.7 is used. The use of piezoelectric body 8 with such a dimensional ratio allows excitation of mode-coupled vibration at a frequency between resonance frequencies for exciting two resonance modes of the longitudinal vibration in the thickness direction and the expansion vibration in the radial direction, so as to obtain vibration displacement $\xi_L$ not smaller than a certain value in the thickness direction. Further, it becomes possible to make piezoelectric body 8 vibrate vibration displacement $\xi_L$ that makes a small change with respect to frequency fluctuations. In present Embodiment 1, part of a frequency band where the mode-coupled vibration can be excited is regarded as a frequency band of a carrier.

Figure 4:
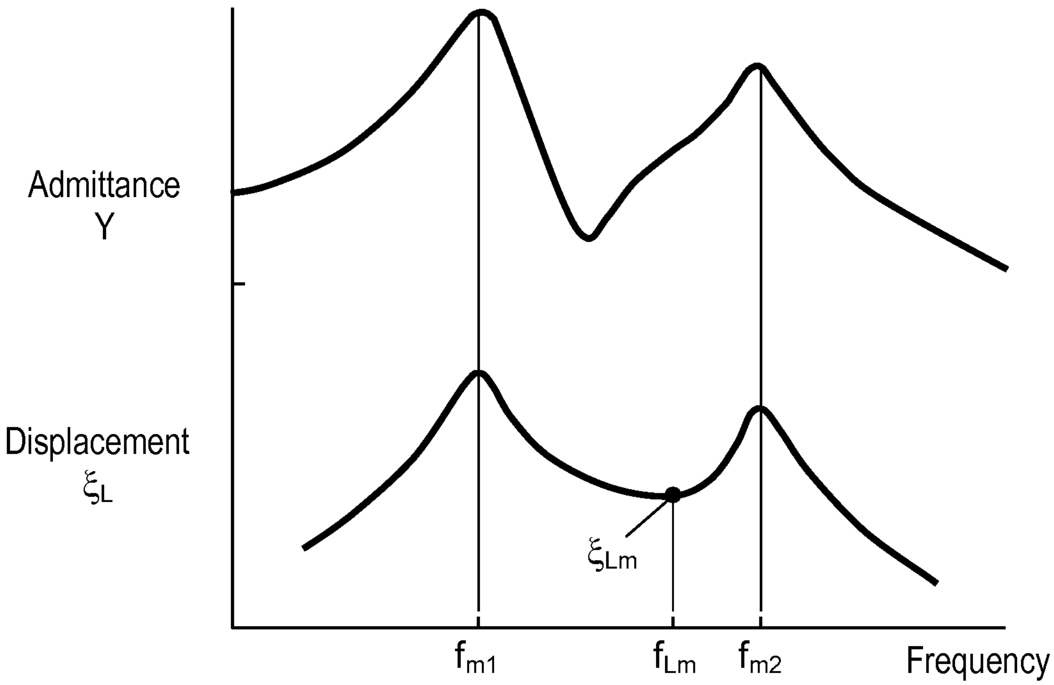
FIG. 4 is a diagram showing frequency characteristics of an admittance and a vibration displacement of a piezoelectric body in Embodiment 1 of the present invention.

FIG. 4 is a diagram showing frequency characteristics of an admittance and a vibration displacement of the piezoelectric body in Embodiment 1 of the present invention. FIG. 4 shows an example of a result of performing numerical calculation of frequency characteristics of admittance Y and vibration displacement $\xi_L$ in the thickness direction of piezoelectric body 8 in present Embodiment 1, by means of a finite element method.

As shown in FIG. 4, piezoelectric body 8 excites resonance modes with high resonance modes of mechanical quality factor Qm respectively at two resonance frequencies, frequency $f_{m1}$ and frequency $f_{m2}$. Further, mode-coupled vibration is excited between frequency $f_{m1}$ and frequency $f_{m2}$ so that a frequency band can be obtained where an absolute value of vibration displacement $\xi_L$ in the thickness direction is small, but an amount of change with respect to the frequency fluctuations is small, as compared with the vicinities of two frequencies $f_{m1}$ and $f_{m2}$. Especially in the vicinity of frequency $f_{Lm}$ with the vibration displacement in the thickness direction being minimal value $\xi_{Lm}$, a flat area with the smallest amount of change in vibration displacement $\xi_L$ with respect to the frequency fluctuations can be obtained.

The foregoing mode-coupled vibration is excited, and a frequency area with frequency $f_{Lm}$, at which vibration displacement $\xi_L$ in the thickness direction is minimal, regarded as a reference is used as the carrier frequency. Even in the case of respective fluctuations in resonance frequencies of the longitudinal vibration in the thickness direction and the expansion vibration in the radial direction of piezoelectric body 8 due to variations in material or shape, or the like, a vibration amplitude of the ultrasonic transducer 7 fluctuates in a small scale and is stable within the range of frequencies where the mode-coupled vibration can be excited. This can result in realization of stable sound pressure in a broad band at the time of self-demodulation of the signal in the audible band.

In terms of the fact that stable sound pressure can be obtained at the time of self-demodulation of the signal in the audible band, details are described below.

Figure 5:
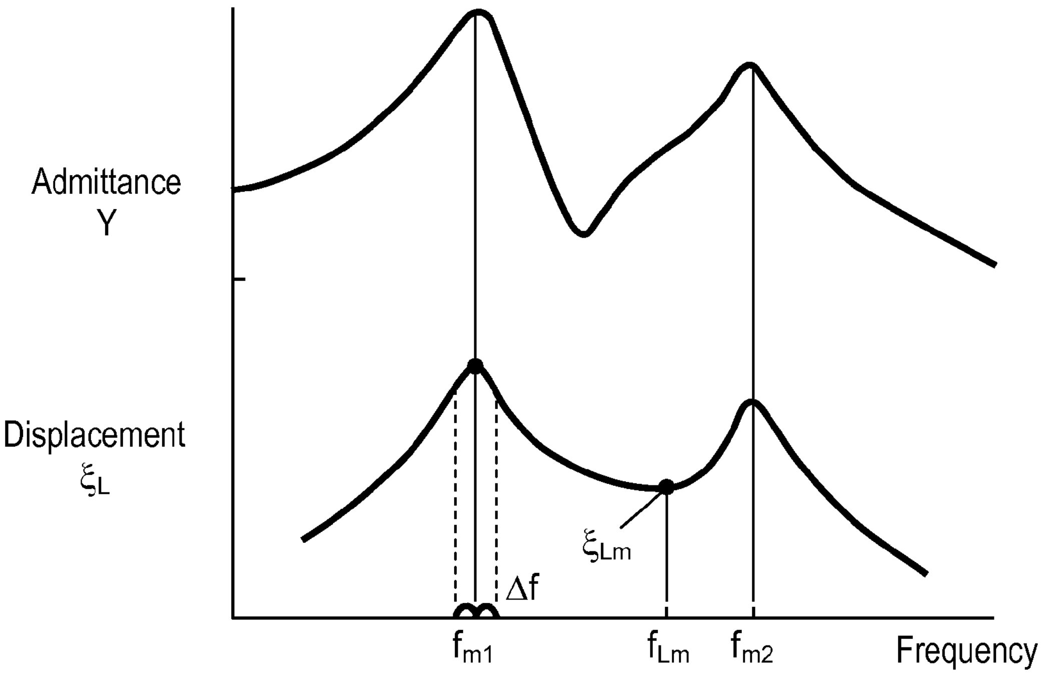
FIG. 5 is a diagram showing that a specific frequency band with a resonance frequency $f_{m1}$ at the center is regarded as a carrier frequency in Embodiment 1 of the present invention.

FIG. 5 is a diagram showing that a specific frequency band with resonance frequency $f_{m1}$ at the center is regarded as the carrier frequency in Embodiment 1 of the present invention. As shown in FIG. 5, assuming that an amplitude of an electric field that is applied to ultrasonic transducer 7 is fixed and a frequency is in certain frequency band $f_{m1}\pm\Delta f$ with resonance frequency $f_{m1}$ at the center, in the vicinity of the resonance frequency $f_{m1}$, mechanical quality factor Qm of the resonance mode is high, whereby the vibration displacement of the ultrasonic transducer 7 is large, and the sound wave emitted from ultrasonic transducer 7 can also obtain high sound pressure. However, at a frequency which is a frequency fluctuation width $\Delta f$ distant from resonance frequency $f_{m1}$, the vibration displacement of ultrasonic transducer 7 is small as compared with the vicinity of resonance frequency $f_{m1}$.

As thus described, when ultrasonic transducer 7 is excited by a signal obtained by modulating a signal in the audible band being a broad band with resonance frequency $f_{m1}$ regarded as the carrier frequency, since an amount of change in vibration displacement of ultrasonic transducer 7 within the range of the frequency of the electric field to be applied is large, fluctuations in sound pressure become large with respect to a frequency of the sound wave emitted from the ultrasonic transducer, and the demodulated sound wave of the audible band has a large amplitude fluctuations due to the frequency, thereby making it difficult to obtain stable sound pressure.

Thereat, as in sound reproducing apparatus 1 in present Embodiment 1, part of a frequency band, where mode-coupled vibration can be excited with an amount of change in vibration displacement $\xi_L$ with respect to frequency fluctuations being relatively small, is regarded as the carrier frequency, thereby allowing reproduction of the signal in the audible band with stable sound pressure in a broad band.

Herein, a result of considering conditions for making piezoelectric body 8 excite mode-coupled vibration from the relation between two resonance frequencies, frequency $f_{m1}$ and frequency $f_{m2}$, are hereinafter described.

Figure 6:
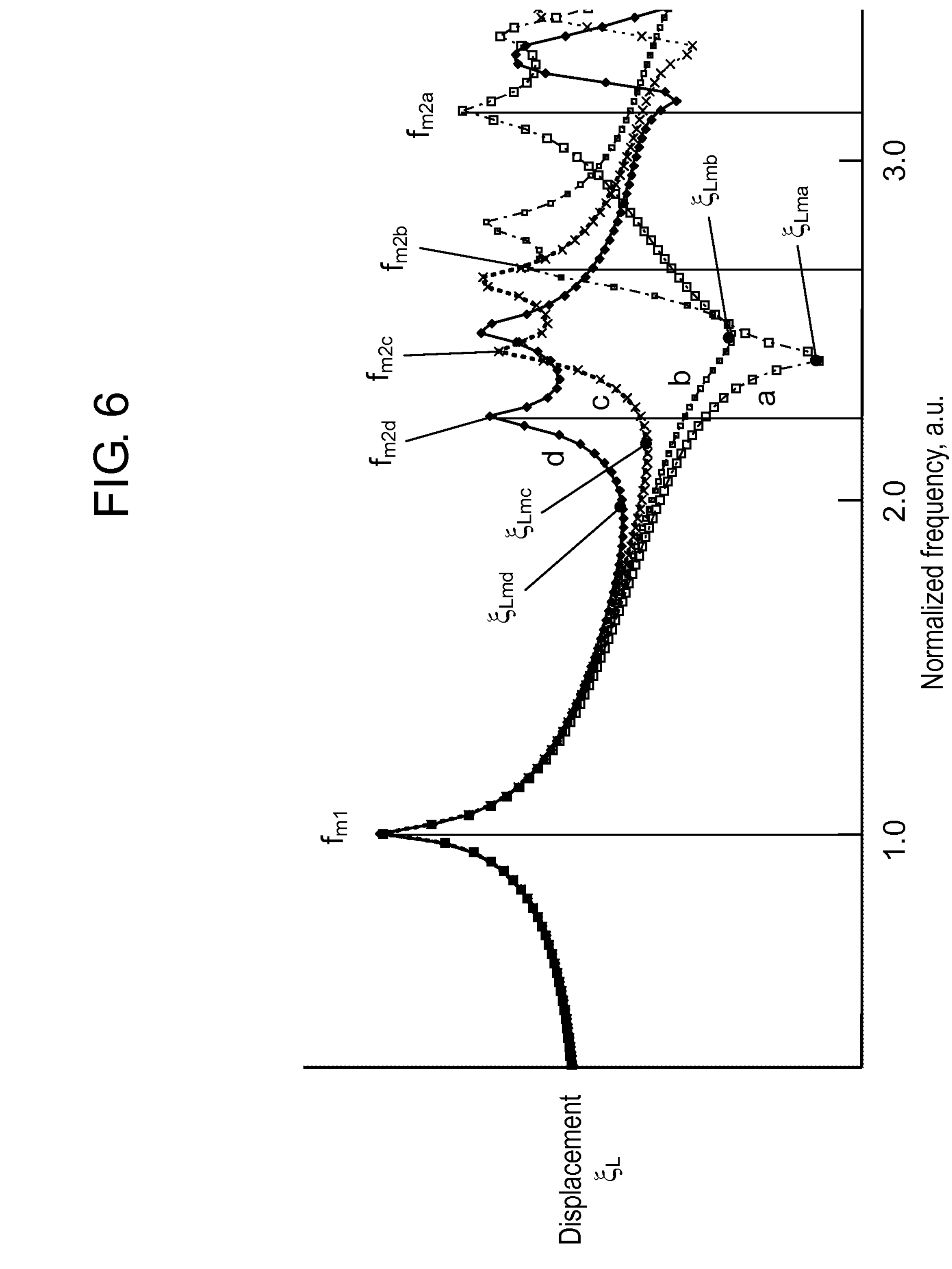
FIG. 6 is a diagram showing the relation between a resonance frequency of expansion vibration in a radial direction and a vibration displacement in a thickness direction in a piezoelectric body in Embodiment 1 of the present invention.

FIG. 6 is a diagram showing the relation between a resonance frequency of expansion vibration in the radial direction and a vibration displacement in the thickness direction in the piezoelectric body 8 in Embodiment 1 of the present invention. FIG. 6 is an example of a result of changing frequency $f_{m2}$ of the expansion vibration in the radial direction in piezoelectric body 8 formed by use of the complex perovskite-based piezoelectric material, to perform numerical calculation of vibration displacement $\xi_L$ in the thickness direction by means of the finite element method.

In FIG. 6, a horizontal axis is one normalizing and representing frequencies of the alternating electric field that is applied to piezoelectric body 8, and respective values of resonance frequencies $f_{m2}$ with frequency $f_{m1}$ regarded as 1 are provided. A vertical axis represents vibration displacement $\xi_L$.

As shown in FIG. 6, in frequency characteristic a and frequency characteristic b with respective resonance frequencies $f_{m2}$ being $f_{m2a}$ (=3.17) and $f_{m2b}$ (=2.69), minimal values $\xi_{Lma}$ and $\xi_{Lmb}$ of vibration displacements $\xi_L$ are extremely small. That is, it is found that at the frequencies showing these minimal values $\xi_{Lma}$, $\xi_{Lmb}$, the vibration displacement $\xi_L$ in the thickness direction of piezoelectric body 8 can hardly be obtained. Further, the vibration displacement $\xi_D$ in the radial direction can hardly be obtained, either. Therefore, it is found that at frequency characteristic a and frequency characteristic b, the two resonance modes independently vibrate without having an effect upon each other.

On the other hand, in frequency characteristic c and frequency characteristic d where resonance frequency $f_{m2}$ is brought near resonance frequency $f_{m1}$ as compared with frequency characteristic a and frequency characteristic b and respective resonance frequencies $f_{m2}$ are made $f_{m2c}$ (=2.44) and $f_{m2d}$ (=2.25), minimal values $\xi_{Lmc}$ and $\xi_{Lmd}$ of vibration displacements $\xi_L$ are large as compared with minimal values $\xi_{Lma}$ and $\xi_{Lmb}$. That is, by bringing resonance frequency $f_{m2}$ near resonance frequency $f_{m1}$, vibration displacement $\xi_L$ in the thickness direction comes to show a value not smaller than a certain value, and it is possible to make piezoelectric body 8 on such a condition excite mode-coupled vibration between frequencies for exciting the resonance mode.

From the numerical calculation, there is obtained a result that, when a normalized value of resonance frequency $f_{m2}$ of piezoelectric body 8 is about 2.5 or smaller, a waveform of the frequency characteristic is shown as those of frequency c and frequency d, to cause occurrence of mode coupling in piezoelectric body 8.

It is therefore found that mode coupling occurs in piezoelectric body 8 when a frequency showing a first resonance mode of piezoelectric body 8 is referred to as $f_{m1}$ and a frequency showing a second resonance mode thereof as $f_{m2}$, $f_{m1}/_{fm2}$ as a ratio of the frequency showing the first resonance mode and the frequency showing the second resonance mode is at least not smaller than 0.4 (=1/2.5). It should be noted that, for making $f_{m1}/f_{m2}$ be not smaller than 0.4, dimensional ratio L/D of piezoelectric body 8 may, for example, be adjusted as appropriate. Adjusting dimensional ratio L/D can adjust frequency $f_{m1}$ showing the first resonance mode and frequency $f_{m2}$ showing the second resonance mode.

In addition, although FIG. 6 is an example of forming piezoelectric body 8 by use of the complex perovskite-based piezoelectric material, a result has be obtained that even in the case of using piezoelectric ceramics such as PZT-based ceramics, mode coupling occurs in piezoelectric body 8 when $f_{m1}/f_{m2}$ is not smaller than 0.4 as a result of similar numerical calculation. It is therefore considered that mode coupling occurs in piezoelectric body 8 when $f_{m1}/f_{m2}$ is at least not smaller than 0.4 with the material used not exclusively to the complex perovskite-based piezoelectric material.

Further, as obvious from the frequency characteristic of admittance Y shown in FIG. 4, an impedance of piezoelectric body 8 is low at resonance frequency $f_{m1}$. A power source connected to ultrasonic transducer 7 intends to allow a larger current to flow to piezoelectric body 8 in the state of the impedance being low as thus described. This may result in an increase in load on the power supply or prevention of the current from flowing. As opposed to this, in a frequency band where mode-coupled vibration can be excited, the impedance of piezoelectric body 8 is relatively high, and hence it is possible to stably drive ultrasonic transducer 7 without having an adverse effect upon the power supply as described above.

Further, the use of piezoelectric body 8 of present Embodiment 1 can give sound reproducing apparatus 1 capable of exerting stable performance on stress applied from the surroundings due to disturbance such as a temperature change or vibration. This is specifically described below.

Figure 7:
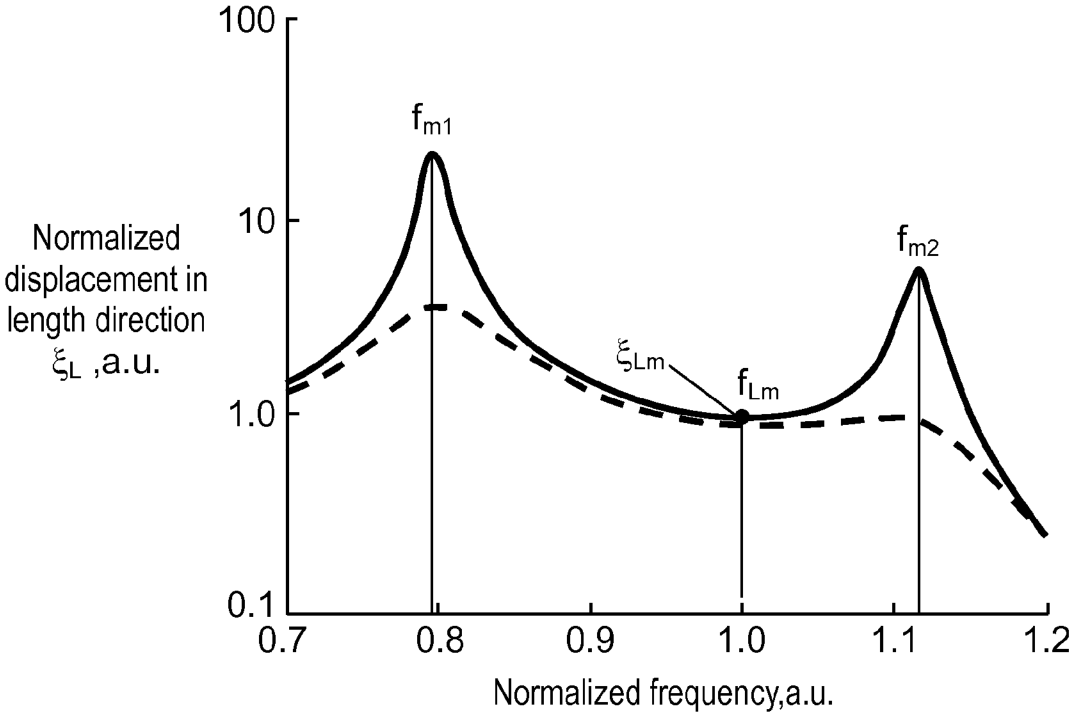
FIG. 7 is a diagram showing a frequency characteristic of the vibration displacement with respect to mechanical quality factor Qm of the piezoelectric body in Embodiment 1 of the present invention.

FIG. 7 is a diagram showing a frequency characteristic of the vibration displacement with respect to mechanical quality factor Qm of the piezoelectric body 8 in Embodiment 1 of the present invention. FIG. 7 is one in which only the frequency characteristic of vibration displacement $\xi_L$ in FIG. 5 is extracted, and a vertical axis and a horizontal axis respectively normalize and show minimal value $\xi_{Lm}$ of the vibration displacement in the frequency band where mode-coupled vibration can be excited, and frequency $f_{Lm}$ at that time. A solid line indicates a frequency characteristic in the case of no load being applied to piezoelectric body 8 without disturbance, and a dotted line indicates a frequency characteristic in the case of stress being applied from the outside to piezoelectric body 8.

It is found that in the vicinities of the respective resonances frequencies, frequency $f_{m1}$ and frequency $f_{m2}$, for exciting the first and second resonance modes, mechanical quality factor Qm of the resonance mode fluctuates depending upon the presence or absence of stress, while vibration displacement $\xi_L$ significantly changes.

For example, in the case of the first resonance mode (longitudinal vibration in the thickness direction: resonance frequency $f_{m1}$), mechanical quality factor Qm becomes lower when stress is applied due to disturbance or the like, and vibration displacement $\xi_L$ decreases down to about one fifth of that in the case of application of no load. On the other hand, in the vicinity of frequency $f_{Lm}$ as the carrier frequency used in present Embodiment 1, vibration displacement $\xi_L$ hardly changes even when similar stress is applied.

That is, FIG. 7 shows that the susceptibility of the vibration displacement of ultrasonic transducer 7 to fluctuations in load from the outside is different depending upon the frequency of the alternating electric field that is applied to the ultrasonic transducer 7. Especially, it is found that in the frequency band where mode-coupled vibration can be excited, the vibration displacement is insusceptible to load fluctuations.

Therefore, in present Embodiment 1, the use of part of the frequency band where mode-coupled vibration can be excited as the carrier frequency leads to a small change in vibration displacement $\xi_L$ even in the case of stress being applied to piezoelectric body 8 due to disturbance such as a temperature change, vibration, or support and fixation conditions. As a consequence, it is possible to obtain sound reproducing apparatus 1 capable of reproducing a sound wave of an audible band with stable sound pressure in a broad band.

Further, the ultrasonic transducer 7 may also be susceptible to heat generated at the time of driving sound reproducing apparatus 1 of present Embodiment 1. That is, a sound velocity of piezoelectric body 8 changes with a change in temperature of ultrasonic transducer 7, and this change thereby causes a change in resonance frequency of ultrasonic transducer 7. Especially, as in present Embodiment 1, in piezoelectric ceramics used as piezoelectric body 8, the temperature dependence of the resonance frequency is high, and the stability of the resonance frequency with respect to the temperature change is low. Therefore, in the case of using a frequency in the vicinity of the resonance frequency as the carrier frequency, it is considered that desired sound pressure cannot be obtained when the resonance frequency changes due to the temperature change.

On the other hand, in present Embodiment 1, part of the frequency band, where mode-coupled vibration insusceptible to a temperature change can be excited, is used as the carrier frequency, and even if a temperature of ultrasonic transducer 7 changes due to heat generated at the time of driving sound reproducing apparatus 1, it is possible to reproduce a sound wave of an audible band with stable sound pressure.

In addition, it is desirable to select the carrier frequency in the frequency band where the mode-coupled vibration can be excited especially with a frequency, at which vibration displacement $\xi_L$ of ultrasonic transducer 7 is minimal, regarded as a reference.

Figure 8:
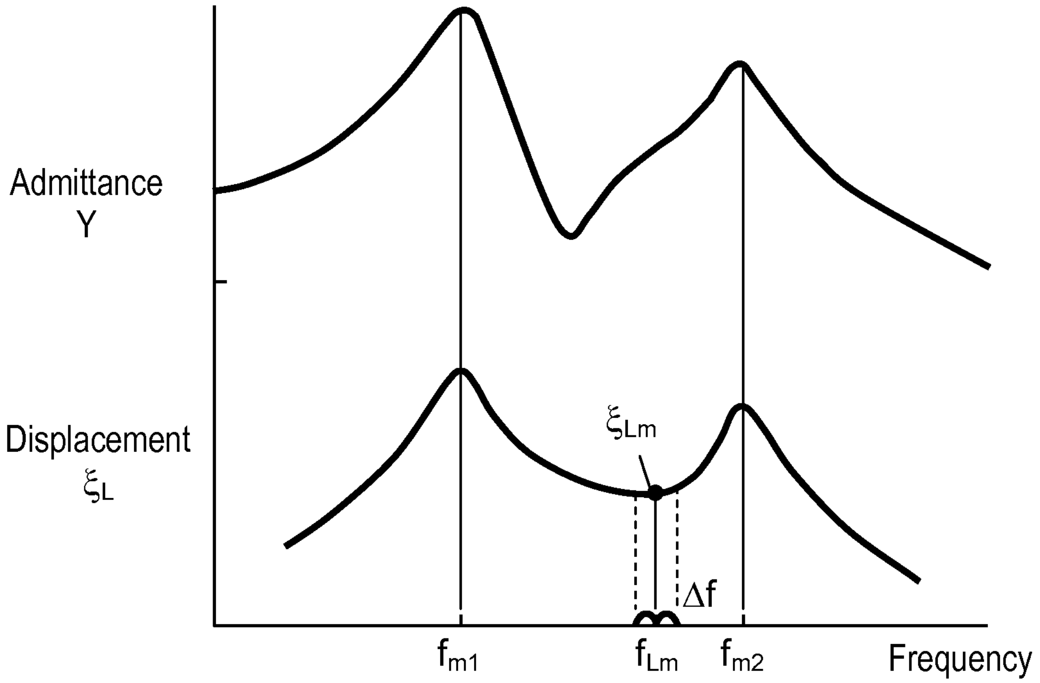
FIG. 8 is a diagram showing that a specific frequency band with frequency $f_{Lm}$, at which the vibration displacement takes minimal value $\xi_{Lm}$, at the center is regarded as the carrier frequency in Embodiment 1 of the present invention.

This is because, as apparent from FIG. 8 as well as FIGS. 4 to 7 shown so far, in the vicinity of frequency $f_{Lm}$ at which vibration displacement $\xi_L$ is minimal value $\xi_{Lm}$, an amount of change in vibration displacement $\xi_L$ with respect to frequency fluctuations becomes small and the frequency characteristic becomes flat. FIG. 8 is a diagram showing that a specific frequency band with a frequency $f_{Lm}$, at which the vibration displacement takes minimal value $\xi_{Lm}$, at the center is regarded as the carrier frequency in Embodiment 1 of the present invention. The use of a frequency band including frequency $f_{Lm}$, for example certain frequency band $f_{Lm}\pm\Delta f$ with frequency $f_{Lm}$ at the center as the carrier frequency can stabilize sound pressure of the reproduced sound wave of the audible band, while broadening the frequency band.

Next described is a method for designing dimensional ratio L/D of thickness L to diameter D of cylindrical piezoelectric body 8.

Figure 9:
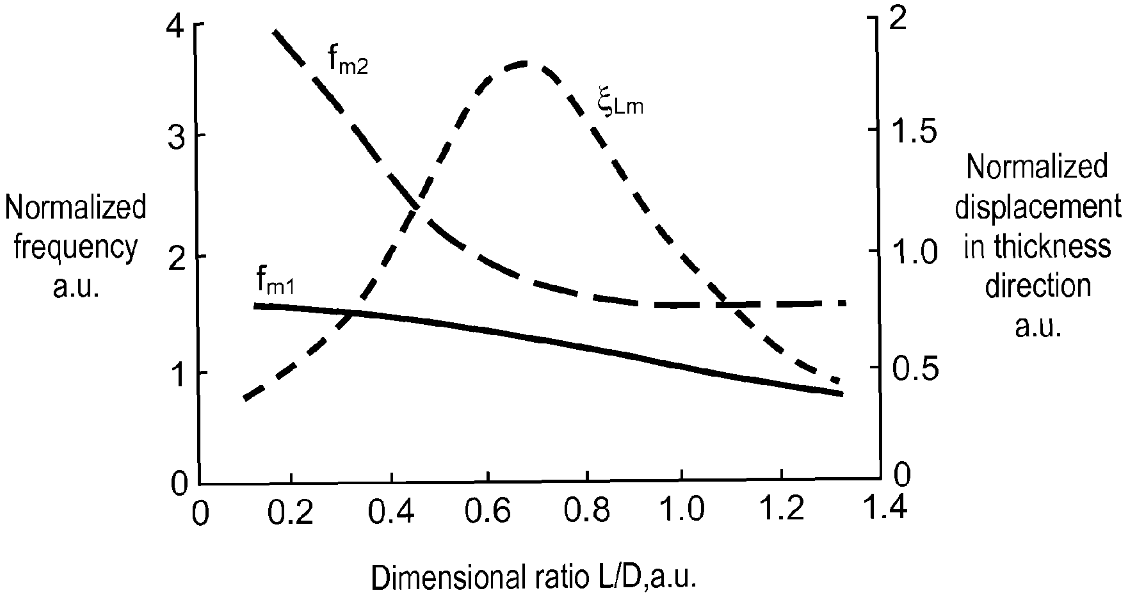
FIG. 9 is a diagram showing the relation between a frequency at which the admittance takes a maximal value, and a minimal value of the vibration displacement in the thickness direction in the case of changing dimensional ratio of the piezoelectric body in Embodiment 1 of the present invention.

FIG. 9 is a diagram showing the relation between a frequency at which an admittance takes a maximal value, and a minimal value of the vibration displacement in the thickness direction in the case of changing dimensional ratio of the piezoelectric body in Embodiment 1 of the present invention. FIG. 9 shows a result of changing dimensional ratio L/D of piezoelectric body 8 formed by use of the complex perovskite-based piezoelectric material, to obtain resonance frequency $f_{m1}$ of the longitudinal vibration in the thickness direction, frequency $f_{m2}$ of the expansion vibration in the radial direction and maximal displacement $\xi_{Lm}$ in the mode-coupled vibration that can be excited between these two resonance modes, by performing the numerical calculation by means of the finite element method.

A horizontal axis is one representing normalized dimensional ratio L/D of piezoelectric body 8. A left-hand axis of vertical axes represents a frequency normalized based upon frequency $f_{Lm}$ in the case of dimensional ratio L/D being made 1. Similarly, a right-hand axis of the vertical axes represents a vibration displacement normalized based upon vibration displacement $\xi_{Lm}$ in the thickness direction at the time of dimensional ratio L/D being made 1. It should be noted that frequency $f_{m1}$ is indicated by a solid line, frequency $f_{m2}$ by an alternate long and short dash line, and vibration displacement $\xi_{Lm}$ by a broken line.

It is found from FIG. 9 that vibration displacement $\xi_{Lm}$ in the mode-coupled vibration increases with increase in dimensional ratio L/D of piezoelectric body 8, and takes a maximal value when dimensional ratio L/D is in the vicinity of 0.7, the value being about 1.7 times as large as when dimensional ratio L/D is 1, and thereafter, the vibration displacement decreases. Hence, in present Embodiment 1, dimensional ratio L/D is made 0.7 with which vibration displacement $\xi_{Lm}$ is maximal.

It is to be noted that dimensional ratio L/D of piezoelectric body 8 is not restricted to 0.7, but may be in the range of ±0.3 with 0.7 at the center, with which vibration displacement $\xi_{Lm}$ takes the maximal value, namely, dimensional ratio L/D may be a value not smaller than 0.4 and not larger than 1.0. When dimensional ratio L/D is a value not smaller than 0.4 and not larger than 1.0, piezoelectric body 8 efficiently vibrates with respect to the alternating electric field to be applied, to allow emission of a sound wave from ultrasonic transducer 7, so as to efficiently output a sound wave of the audible band as the sound reproducing apparatus.

As opposed to this, when dimensional ratio L/D of piezoelectric body 8 is made a value below 0.4 or exceeding 1.0, a vibration loss of piezoelectric body 8 becomes large, thereby making the vibration amplitude small with respect to the alternating electric field to be applied. With decrease in sound wave emitted from ultrasonic transducer 7, heat generation due to the vibration loss has an adverse effect upon the material characteristic of piezoelectric body 8, to make the operation reliability of ultrasonic transducer 7 more likely to deteriorate, which is not preferred.

In addition, although the above description is an example of forming piezoelectric body 8 by use of the complex perovskite-based piezoelectric material, even in the case of using a different material such as a piezoelectric monocrystal or piezoelectric ceramics like PZT-based ceramics, optimal dimensional ratio L/D of cylindrical piezoelectric body 8 can be decided by performing similar numerical calculation and prototype review.

(Embodiment 2)

In Embodiment 1, sound emitting unit 6 is configured by one ultrasonic transducer, but in Embodiment 2, an example of constituting the sound emitting unit by a plurality of ultrasonic transducers 7 is described below.

Figure 10:
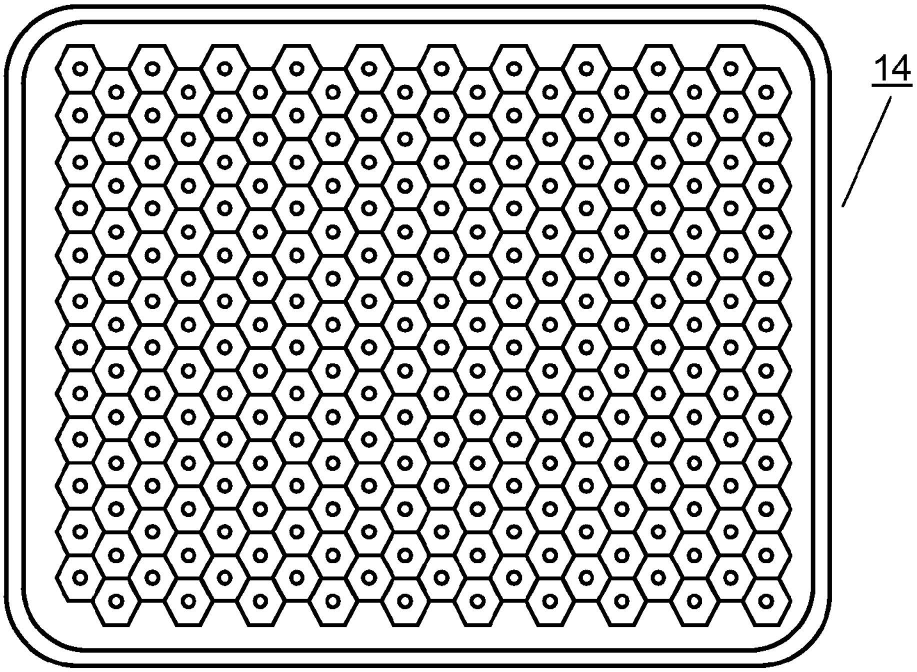
FIG. 10 is a front view of a sound emitting unit in Embodiment 2 of the present invention.

FIG. 10 is a front view of a sound emitting unit in Embodiment 2 of the present invention. As shown in FIG. 10, sound emitting unit 14 in present Embodiment 2 is configured by planar arrangement of a plurality of ultrasonic transducers 7.

Figure 11:
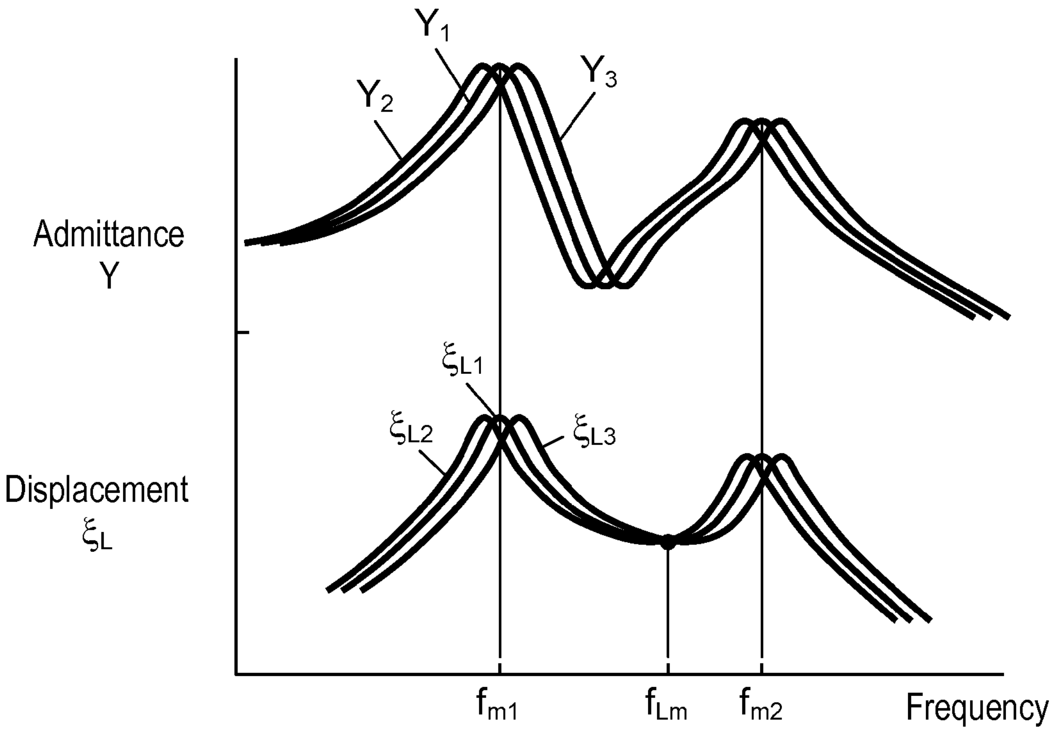
FIG. 11 is a diagram showing frequency characteristics of an admittance and a vibration displacement of each of piezoelectric bodies constituting three ultrasonic transducers in Embodiment 2 of the present invention.

FIG. 11 is a diagram showing a frequency characteristic of an admittance and a frequency characteristic of a vibration displacement of each of piezoelectric bodies constituting three ultrasonic transducers in Embodiment 2 of the present invention. FIG. 11 is one showing the frequency characteristic of the admittance and the frequency characteristic of the vibration displacement of each of the piezoelectric bodies constituting three ultrasonic transducers 7 among ultrasonic transducers 7 constituting sound emitting unit 14 of FIG. 10.

Admittance $Y_1$ and vibration displacement $\xi_{L1}$, admittance $Y_2$ and vibration displacement $\xi_{L2}$, and admittance $Y_3$ and vibration displacement $\xi_{L3}$ respectively show the admittances of the same piezoelectric body 8 and the frequency characteristics of the vibration displacement.

As shown in FIG. 11, admittance $Y_1$, admittance $Y_2$ and admittance $Y_3$, as well as vibration displacement $\xi_{L1}$, vibration displacement $\xi_{L2}$, and vibration displacement $\xi_{L3}$, of three piezoelectric bodies 8 do not have the same frequency characteristics. This is attributed to variations in manufacturing condition, material characteristic, shape dimensions, or the like at the time of manufacturing piezoelectric body 8. Further, since variations at the time of supporting and fixing piezoelectric bodies 8 to assemble ultrasonic transducers 7 also have an effect, in the frequency characteristics of the admittances or the frequency characteristics of the vibration displacements of the plurality of ultrasonic transducers 7 constituting sound emitting unit 14, the resonance frequencies capable of exciting the resonance mode also vary. In the case of using such a plurality of ultrasonic transducers 7 with the resonance frequencies not being the same and fixing the carrier frequency to the vicinity of frequency $f_{m1}$ or the vicinity of frequency $f_{m2}$ to constitute a sound reproducing apparatus, sound pressure levels of the sound waves emitted from respective ultrasonic transducers 7 vary, resulting in the possibility to make it more difficult to obtain stable sound pressure at the time of demodulating the sound wave of the audible band.

Thereat, in present Embodiment 2, as in Embodiment 1, not the resonance frequency for exciting the resonance mode, but part of the frequency band, where mode-coupled vibration to be excited between the resonance modes can be excited, is used as the carrier frequency.

As piezoelectric body 8 in present Embodiment 2, there is used one similar to piezoelectric body 8 in Embodiment 1, as well as a cylindrical piezoelectric body with dimensional ratio L/D of thickness L to diameter D made 0.7. With such a dimensional ratio being set, when the plurality of piezoelectric bodies 8 constitute sound emitting unit 14 as shown in FIG. 10 and part of a frequency band where mode-coupled vibration can be excited in piezoelectric body 8 is regarded as the carrier frequency, an electric field with the same frequency and the same amplitude is applied to each of piezoelectric bodies 8. For this reason, variations in vibration displacement of piezoelectric body 8 between individuals is small, and variations in sound pressure of the sound wave emitted from ultrasonic transducer 7 are also small between the individuals. This can result in reproduction of a demodulated sound wave of the audible band with high and stable sound pressure.

Although sound emitting unit 14 is the example of the case of individual differences existing in resonance frequencies of piezoelectric bodies 8 constituting ultrasonic transducers 7, it is also effective in the case of constituting sound emitting unit 14 by piezoelectric bodies 8 having the same resonance frequency. That is, a change in temperature of ultrasonic transducer 7 during the operation or application of stress to piezoelectric body 8 at the time of assembly of ultrasonic transducer 7 may lead to a change in frequency characteristic of a vibration amplitude of ultrasonic transducer 7, and also in such a case, the configuration of present Embodiment 2 is applicable.

Further, although sound reproducing apparatus 1 according to present Embodiment 2 in FIG. 10 is illustrated as a configuration where ultrasonic transducers 7 are densely arranged in honeycomb structure in sound emitting unit 14, the arrangement method is not restricted to this, but may have a similar effect so long as having a configuration where a sound wave emitted from the sound emitting unit is efficiently collected at a predetermined position.

(Embodiment 3)

Figure 12:
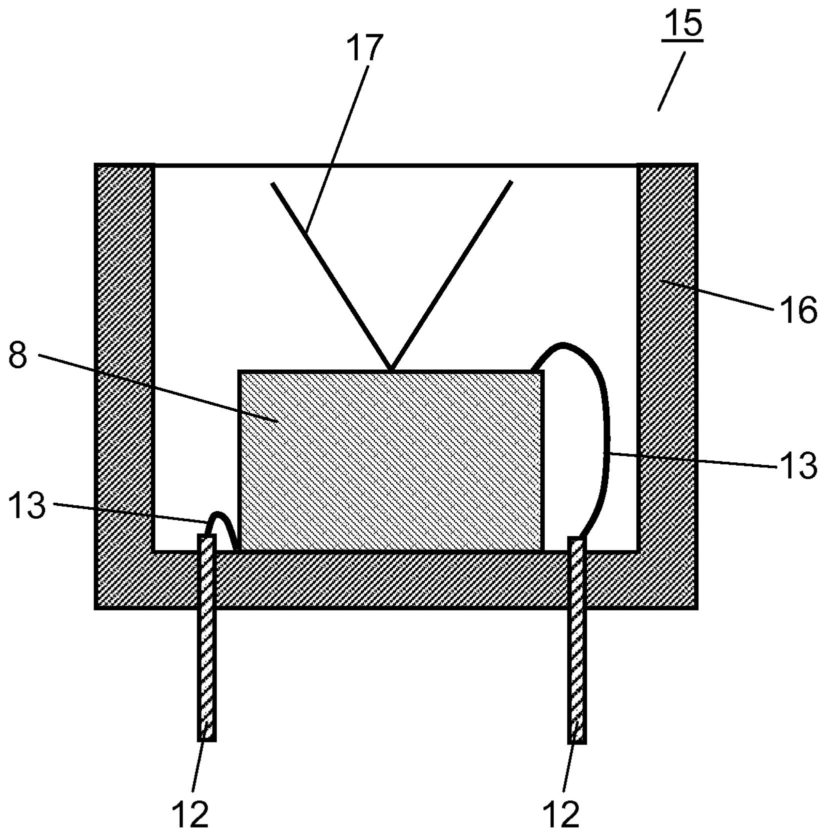
FIG. 12 is a cross-sectional view of an ultrasonic transducer in Embodiment 3 of the present invention.

Hereinafter, a configuration of ultrasonic transducer 15 in Embodiment 3 is described with reference to FIG. 12. FIG. 12 is a sectional view of ultrasonic transducer 15 in present Embodiment 3.

It is to be noted that present Embodiment 3 is one obtained by making part of the configuration of ultrasonic transducer 7 shown in Embodiment 1 different. Since the configuration other than this is similar to in Embodiment 1, the same portions are provided with the same numerals, and a detailed description thereof is omitted while only different portions are described.

As shown in FIG. 12, in present Embodiment 3, case 16 has a cylindrical shape with a bottom, and piezoelectric body 8 is mounted in the central part on the inner bottom surface of this case 16. Two rod-like terminals 12 are provided on the inner bottom surface of case 16, and in a similar manner to Embodiment 1, these terminals 12 are respectively electrically connected to electrodes of piezoelectric body 8 through leads 13. It should be noted that case 16 is made of aluminum as in Embodiment 1.

Conical resonator 17 is fixed with an adhesive to the central part of the top surface of piezoelectric body 8. A material for this resonator 17 is desirably one with light weight and a sound velocity of the degree of 3000 m/s to 10000 m/s. For example, with the use of metal such as aluminum or SUS (Stainless Used Steel), resonator 17 capable of following an amplitude of piezoelectric body 8 can be configured so that the amplitude can be amplified on a vibration mode as it is without changing the shape of the vibration mode. That is, resonator 17 in present Embodiment 3 is one showing a resonant characteristic corresponding to vibration of piezoelectric body 8, and capable of emitting a stable ultrasonic wave to the medium such as air with respect to the amplitude of piezoelectric body 8.

It is to be noted that resonator 17 is also configured to be surrounded by case 16 as shown in FIG. 12.

In ultrasonic transducer 15 as thus configured, resonator 17 is provided to extend a diameter of a sound source, so as to allow improvement in output of the sound pressure.

Further, since sound reproducing apparatus 1 in Embodiment 1 outputs an ultrasonic wave with high directivity as described above, a sound wave of the audible band can be reproduced only in a very narrow space range. Herein, in the case of wishing to widen to some degree the space range where the sound wave of the audible band is reproduced, or in some other case, such widening can be achieved by providing resonator 17, as in ultrasonic transducer 15 of present Embodiment 3, so as to expand the directivity of sound reproducing apparatus 1.

Further, in the case of parallely arranging a plurality of ultrasonic transducers 15 of present Embodiment 3 to constitute the sound emitting unit as in above Embodiment 2, the ultrasonic transducer 15 has a characteristic of a directivity spread to some degree by resonator 17, as described above. For this reason, the emission range of the ultrasonic wave outputted from each ultrasonic transducer 15 tends to overlap an emission range of the ultrasonic wave of ultrasonic transducer 15 arranged in the vicinity thereof. That is, in a position where the emission ranges overlap each other as thus described, the ultrasonic wave outputted from each ultrasonic transducer 15 is added up, thereby to allow hearing of the reproduced sound wave of the audible band at further larger sound pressure.

Moreover, the directivity by resonator 17 is adjustable by appropriately changing an angle of the conical portion of resonator 17. Furthermore, a circular portion of the cone is not restricted to a perfect circle, but may be an ellipse.

It is to be noted that in each embodiment in the present invention, the case has been described where piezoelectric body 8 constituting ultrasonic transducer 7,15 is formed into a cylindrical shape, and as vibration to be excited by piezoelectric body 8, there is used vibration obtained by mode-coupling the resonance vibration of the longitudinal vibration in the thickness direction and the resonance vibration of the expansion vibration in the radial direction. However, in the present invention, the shape of the piezoelectric body and the vibration mode for excitation in the piezoelectric body are not restricted to a specific shape or a specific resonance mode. For example, a similar effect can also be obtained in the case of forming piezoelectric body 8 into a prismatic shape and using vibration obtained by mode-coupling longitudinal vibration in the thickness direction and expansion vibration in a diagonal direction or a side direction.

INDUSTRIAL APPLICABILITY

A sound reproducing apparatus of the present invention regards part of a frequency band where mode-coupled vibration can be excited, as a carrier frequency, thereby to allow sound pressure of a reproduced sound wave of an audible band to be stabilized in a broad band. By making use of high directivity of the ultrasonic wave, the sound reproducing apparatus is useful as one for reproducing the sound wave of the audible band only in a restricted space range.

REFERENCE MARKS IN THE DRAWINGS

1 sound reproducing apparatus
2 audible band signal source
3 carrier oscillator
4 modulator
5 power amplifier
6 sound emitting unit
7 ultrasonic transducer
8 piezoelectric body
9 acoustic matching layer
10 case
11 terminal block
12 terminal
13 lead
14 sound emitting unit
15 ultrasonic transducer
16 case
17 resonator

The invention claimed is:

1. A sound reproducing apparatus, comprising:

an audible band signal source that produces a signal in an audible band;

a carrier oscillator that produces a carrier;

a modulator that modulates the signal in the audible band with the carrier; and a sound emitting unit that outputs a signal, outputted from the modulator, as a sound wave by means of an ultrasonic transducer, wherein the ultrasonic transducer includes only one cylindrical piezoelectric body, the piezoelectric body has a first resonance mode in which vibration displacement is maximal at a first frequency ($f_{m1}$) and a second resonance mode in which the vibration displacement is maximal at a second frequency ($f_{m2}$) which is larger than the first frequency, the piezoelectric body includes an uninterrupted portion of piezoelectric material extending diametrically across the cylindrical piezoelectric body from one side to another, the ultrasonic transducer is excited in a mode-coupled vibration at a frequency between the first frequency ($f_{m1}$) and the second frequency ($f_{m2}$), such that a first vibration of the first resonance mode and a second vibration of the second resonance mode are coupled, and a frequency of the carrier is greater than the first frequency and less than the second frequency.

2. The sound reproducing apparatus according to claim 1, wherein when the first frequency is referred to as $f_{m1}$ and the second frequency is referred to as $f_{m2}$, a ratio of $f_{m1}/f_{m2}$ is made not smaller than 0.4.

3. The sound reproducing apparatus according to claim 1, wherein the frequency of the carrier is a third frequency in which the vibration displacement is minimal between the first frequency and the second frequency.

4. The sound reproducing apparatus according to claim 1, wherein the piezoelectric body is cylindrical, and when a thickness and a diameter of the piezoelectric body are respectively referred to as L and D, a dimensional ratio L/D of the piezoelectric body is from 0.4 to 1.0.

5. The sound reproducing apparatus according to claim 1, wherein a substantially conical resonator is fixed to a top surface of a central part of the piezoelectric body.

6. The sound reproducing apparatus according to claim 1, wherein the sound emitting unit is made up of a plurality of ultrasonic transducers.

7. The sound reproducing apparatus according to claim 1, wherein the cylindrical piezoelectric body lacks any opening extending axially therethrough from one end to an opposite end thereof.

* * * * *